United States Patent [19]
Jidai et al.

[11] Patent Number: 4,576,694
[45] Date of Patent: Mar. 18, 1986

[54] METHOD FOR PRODUCING ELECTRICALLY INSULATED CONDUCTOR

[75] Inventors: Eiki Jidai; Aiichiro Hashizume, both of Amagasaki, Japan

[73] Assignee: Mitsubishi Denki Kabushiki Kaisha, Tokyo, Japan

[21] Appl. No.: 643,762

[22] Filed: Aug. 24, 1984

Related U.S. Application Data

[63] Continuation of Ser. No. 370,907, Apr. 22, 1982, abandoned.

[30] Foreign Application Priority Data

May 9, 1981 [JP] Japan .................................. 56-71817

[51] Int. Cl.$^4$ ...................... C25D 13/06; C25D 13/10; C25D 13/12
[52] U.S. Cl. ............................. 204/181.1; 204/181.4; 204/181.6
[58] Field of Search ........... 204/181 R, 181 T, 181 N, 204/181.1, 181.4, 181.5, 181.6

[56] References Cited

U.S. PATENT DOCUMENTS 2,707,703  5/1955  Dorst ............................... 204/181 N
3,663,383  5/1972  Matsuda et al. ................ 204/181 T
3,891,526  6/1975  Masuda et al. .................. 204/181 T

FOREIGN PATENT DOCUMENTS 2613814  10/1976  Fed. Rep. of Germany .
065534   5/1977   Japan .
033084   12/1977  Japan .
142442   12/1978  Japan .

OTHER PUBLICATIONS

*Chemical Abstracts*, vol. 86, 1977, p. 53, Abstract No. 122508t, Jidai et al, "Two-Layer Wire Insulation".
*Chemical Abstracts*, vol. 86, 1977, p. 100, Abstract No. 123142f, Jidai et al, "Electrophoretic Coating of Wires".
*Chemical Abstracts*, vol. 89, 1978, p. 72, Abstract No. 61126e, Sato et al, "Electrophoretic Coating of Metal Substrates".
*Chemical Abstracts*, vol. 90, 1979, p. 44, Abstract No. 138809k, Fujii et al, "Electric Insulation".

*Primary Examiner*—Andrew H. Metz
*Assistant Examiner*—B. J. Boggs, Jr.
*Attorney, Agent, or Firm*—Oblon, Fisher, Spivak, McClelland & Maier

[57] ABSTRACT

Improved method for producing an electrically insulated conductive body such as coils, etc. for use in electrical apparatuses and appliances, wherein an electrically conductive body is immersed in an electrodeposition paint liquid prepared by dispersing into water mica powder as an inorganic insulative substance and water-dispersion varnish as an organic insulative substance, thereby forming an electro-deposited layer on the electrically conductive body by electrophoresis, followed by drying the electro-deposited layer coated on the electrically conductive body under heat, then the dried electro-deposited conductive body is immersed in a water-soluble resin solution containing therein a curing agent, followed by drying the resin coating under heat, and finally the resin-coated, electro-deposited conductive body is impregnated with an impregnating resin, followed by heat-setting the resin as impregnated.

6 Claims, No Drawings

METHOD FOR PRODUCING ELECTRICALLY INSULATED CONDUCTOR

This application is a continuation of application Ser. No. 370,907, filed Apr. 22, 1982, now abandoned.

BACKGROUND OF THE INVENTION

1. Field of the Invention

This invention relates to a novel method for producing an electrically insulated conductive body by utilization of electrophoresis. The method according to the present invention is particularly suited for production of electrically insulated conductive bodies such as coils, etc. used in electrical apparatuses and appliances.

2. Description of the Prior Arts

Production of the electrically insulated conductive bodies such as a coil, etc. for use in electrical apparatuses and appliances has heretofore been done by impregnating the coil made of electric conductor, which is wound together with inorganic-organic composite type porous insulating material, with an impregnating resin containing therein curing agent, curing catalyst, curing accelerator, and so on, followed by heat-setting the impregnated resin.

Such conventional method, however, has various disadvantages such that a great deal of man power is required for winding the porous insulating material together with the electric conductor, which inevitably lower the working efficiency; the socalled "dropping phenomenon" takes place due to lowered viscosity in the resin composition when the impregnated resin is to be cured under heat; in view of the fact that the impregnating resin contains the curing agent, a curing catalyst, and a curing accelerator as its composition, the resin tends to be cured when left over a long period of time, hence its usable period of time is inevitably restricted; and, for the preceding reason, maintenance and control of the storage vessel for the impregnating resin is rather complicated.

The present inventors have so far developed various methods for forming an electro-deposited insulating layer by electrophoresis using electrodeposition paint consisting of mica and water-dispersion varnish (vide: Laid-Open Japanese Patent Application No. 89178/76 and No. 114602/76), the methods being capable of dispersing with winding the electrical conductor together with the porous insulating material, which has been one of the disadvantages in the abovementioned conventional method for its production.

These forming methods, however, have such a disadvantage that the mechanical strength of the electrolytically deposited insulating layer at a stage prior to its impregnation with the impregnating resin is weak, which weakness causes cracks and tear-offs to occur in it when the insulating layer is fitted inside a slot of an iron core.

As the result of diligent and strenuous researches conducted in an attempt to remove the defects in such forming methods as well as those remaining in the conventional methods, the present inventors have discovered that all of the abovementioned defects could be solved by immersing the electrolytically deposited insulating layer, after its formation, into an aqueous solution added in advance with the curing accelerator, based on which discovery they completed the present invention.

SUMMARY OF THE INVENTION

It is therefore an object of the present invention to provide an improved method for producing an electrically insulated conductor body free from all the aforementioned defects.

It is another object of the present invention to provide an improved method for producing an electrically insulated conductive body free from various disadvantages inherent in the conventional methods, which has been solved by immersing an electro-deposited layer in a water soluble resin solution added in advance with a curing accelerator.

More particularly, according to the present invention, there is provided a method for producing an electrically insulated conductive body, which comprises steps of immersing an electrically conductive body into an electro-deposition paint obtained by dispersing into water mica as an inorganic insulative substance and water-dispersion varnish as an organic insulative substance, forming an electro-deposited layer on the electrically conductive body by electrophoresis, drying the electrically conductive body coated with the electro-deposited layer under heat, further immersing the dried electro-deposited conductive body into a water-soluble resin solution containing therein a curing agent, followed by drying the resin coating under heat, and then impregnating the electrically insulated conductive body with an impregnating resin, followed by heat-setting the resin as impregnated.

With the above-described method according to the present invention, there would accrue various advantages such that the electro-deposited layer has a remarkably improved mechanical strength even prior to its impregnation treatment with the impregnating resin; no cracks and tear-offs appear in the electro-deposited layer, which tend to occur at the time of fitting the insulating layer onto the iron core; any complicated and uneconomical aspects can be eliminated in maintenance and control of the resin storing vessel for keeping the impregnating resin added with the curing agent, curing accelerator, etc. in an appropriate viscosity, as has been experienced in the conventional methods; no dropping phenomenon occurs with the impregnating resin when it is to be heat-set; and adhesive property of the impregnating resin to the adhesion surface improves. As the result, there can be obtained the electrically insulated conductive body which is supple and remarkably stable in quality.

The foregoing objects, other objects, and the specific manner of preparing the electro-deposited insulating layer according to the present invention will become more apparent and understandable from the following detailed description thereof along with several preferred examples.

DETAILED DESCRIPTION OF THE PREFERRED EMBODIMENTS

The water-dispersion varnish for use in the present invention may be of any kind that is capable of electrolytic deposition. As the suitable examples, there can be enumerated acryl type water-dispersion varnish, epoxy ester type water-dispersion varnish, and so forth. Mica powder to be used should preferably have a particle size that does not pass through a 20-mesh sieve, but passes through a 200-mesh sieve, particularly, 35-mesh sieve. A mixing quantity of the water-dispersion varnish and the mica powder should preferably be 5 to 30 parts by weight of the water-dispersion varnish to 100 parts by weight of the mica powder in consideration of the impregnating property of the impregnating resin at the post-stage of the manufacturing process of the electrically insulated conductor.

For the water-soluble resin to be used in the present invention, arcyl type resins and epoxy ester type resins, for example, are suitable, the concentration of which may be from 1 to 10% by weight, or preferably, from 1 to 6% by weight. For the curing accelerator to be contained in the water-soluble resin, any of water-soluble curing accelerators may be suited for the purpose. Examples of such curing accelerators are triethanol amine and other organic amines, and 2-ethyl-4-methylimidazole (2E4MZ) and other imidazoles. The concentration of the curing accelerator in the mixture ranges from 2 to 20% by weight, or preferably, from 3 to 10% by weight. For the impregnating resin to be used in the ultimate stage of the manufacturing process, any of the well-known thermosetting resin used in electrical apparatuses and appliances in general may be used without limitation.

With a view to enabling those skilled in the art to put the method for producing the electrically insulated conductor into practice according to the present invention, there will be presented an actual example of preparing the water-dispersion varnish for electrolytic deposition, several preferred examples of manufacturing the electrically insulated conductors according to the present invention, and a comparative example. It should, however, be noted that the present invention is not limited to these examples alone, but any changes and modifications may be made in the components and their mixing ratio within the ambit of the present invention as set forth in the appended claims.

EXAMPLE OF PREPARING WATER-DISPERSION VARNISH FOR ELECTRODEPOSITION

From a mixture of the following ingredients, there was obtained acid-added epoxy resin having an acid value of from 30 to 60.

| Ingredients | Parts (by wt.) |
| --- | --- |
| EPIKOTE 1001 (bisphenol type epoxy resin, a product of Shell Chemical Company) | 100 |
| Tetrahydrophthalic anhydride | 25 |
| Ethylene glycol | 6 |

The thus obtained epoxy resin was dispersed in warm water containing ammonia, from which water-dispersion varnish having a pH value of from 7.0 to 8.0 was obtained by blowing nitrogen gas into the liquid, and other methods.

EXAMPLE 1

Mica powder of a particle size which was passable through a 35-mesh sieve and had been well washed with deionized water was mixed with the abovementioned water-dispersion varnish consisting of bisphenol type epoxy resin (EPIKOTE 1001) and tetrahydrophthalic anhydride and ethylene glycol as the principal constituents in a mixing quantity of 100 parts by weight of mica powder with respect to 10 parts by weight of the resin component in the water-dispersion varnish. To this mixture, deionized water was added and agitated sufficiently, thereby preparing uniformly dispersed electrodeposition paint liquid containing therein a total non-volatile substance at a ratio of 15% by weight to the total paint liquid.

A coil for an induction motor fabricated by bundling strands, on which glass fibers were wound in advance by mechanical means, was immersed in the electrodeposition paint liquid thus prepared, and then a direct current voltage of 100 volts was applied for 20 seconds across opposite electrodes at an interpole distance of 50 cm between them, thereby forming on the coil the electro-deposited layer consisting of mica and a resin component in the water-dispersion varnish.

Subsequently, the coil, on which the electro-deposited layer was formed, was immersed in a 2% conc. acryl type water-soluble resin added with 5% conc. triethanolamine as the curing accelerator. Thereafter, the coil was heated for 15 minutes at 150° C. for drying, thereby forming a coating film of 1.0 mm thick on it.

The thus coated coil was further subjected to the vacuum-impregnation with epoxy resin consisting of 100 parts by weight of EPON 828 (a product of Shell Chemical Company) not containing therein the curing accelerator and 98 parts by weight of HN 2200 (a product of Hitachi Kasei Kogyo K.K.), followed by heating the same for 5 hours at 150° C. to set, thereby manufacturing the electrically insulated conductive body for the induction motor.

The electrically insulated conductive body thus obtained did not cause the dropping phenomenon of epoxy resin, and exhibited highly stable quality.

EXAMPLES 2 TO 7

The same procedures as in Example 1 above were followed except for use of the components, their mixing ratio, and heat-setting time as shown in the following Table 1, thereby obtaining the electrically insulated conductive body for the induction motor.

COMPARATIVE EXAMPLE

Mica powder which was passable through a 35-mesh sieve and which had been well washed with deionized water was admixed into the abovementioned water-dispersion varnish composed of bisphenol type epoxy resin (EPIKOTE 1001) and tetrahydrophthalic anhydride and ethylene glycol in a quantity of 100 parts by weight thereof with respect to 15 parts by weight of the resin component in the water-dispersion varnish. Then, deionized water was added to the mixture and the whole batch was sufficiently agitated, thereby preparing uniformly dispersed electro-deposited paint liquid containing therein the total non-volatile component of 15% by weight with respect to the paint liquid as a whole.

Into the thus prepared electrodeposition paint liquid, there was immersed a coil for an induction motor fabricated by bundling strands, on which glass fiber was wound in advance by mechanical means. After the immersion, a direct current voltage of 100 volts was applied for 20 seconds across opposite electrodes at an interpole distance between them of 50 cm, thereby forming on the coil the electro-deposited layer consisting of mica and a resin component in the water-dispersion varnish.

The electro-deposited layer was then heated for 15 minutes at 150° C. to dry, whereby a coating film of 1.0 mm thick was obtained. The thus obtained coil was immersed in epoxy resin liquid (EPON 828: HN 2200=100: 98 parts by weight) added with 1 part by weight of zinc octylate (Oct.-Zn) as a curing catalyst, followed by the vacuum-impregnation of the coil with epoxy resin. Thereafter, the resin-coated coil was heated for 10 hours at 150° C. to set the resin, thereby obtaining the electrically insulated conductive body for the induction motor.

The following Table 1 also indicates, for each example, the breakdown voltage (BDV) and the dielectric loss tangent (tan δ) of the electrolytically deposited insulating coating on the coil at its initial stage and after it was subjected to thermal deterioration for 16 days at 250° C., with a view to evaluating the characterstics of the electrically insulated conductive body obtained in the Comparative Example and Examples 1 through 7, respectively. Incidentally, a reference to "GP-5" in the column of "Impregnating Resin" in Table 1 is a trade-name of unsaturated polyester resin produced by Ryoden Kasei K.K.

TABLE 1

| Example | Comparative | Exp. 1 | Exp. 2 | Exp. 3 | Exp. 4 |
|---|---|---|---|---|---|
| Electrolytically deposited paint (paint by wt.) | Mica powder (100) Epoxy ester type water-dispersion varnish (15) | Mica powder (100) Epoxy ester type water-dispersion varnish (10) | Mica powder (100) Epoxy ester type water dispersion varnish (20) | Mica powder (100) polyester type water-dispersion varnish (10) | Mica powder (100) Epoxy ester type water-dispersion varnish (20) |
| Water-soluble resin & curing accelerator (%) | — | Acryl type water-soluble resin (2.0) Triethanol amine (5.0) | Acryl type: water-soluble resin (3.0) benzyldimethyl amine (10.0) | Acryl type water-soluble resin (4.0) Potassium persulfate (5.0) | Acryl type water-soluble resin (5.0) Benzoyl peroxide (3.0) |
| Impregnating resin (part by wt.) | EPON 828 (100) HN 2200 (98) Oct.-Zn(1.0) | EPON 828 (100) HN 2200 (98) | EPON 828 (100) HN 2200 (98) | GP-5 | GP-5 |
| Heating-setting time (hr.) | 10 | 5 | 4 | 6 | 6 |
| Characteristics Initial | | | | | |
| BDV (kv) | over 50 | over 50 | over 50 | over 50 | over 50 |
| tan δ (%) | 0.3 | 0.2 | 0.2 | 0.2 | 0.2 |
| After deterioration | | | | | |
| BDV (kV) | 46 | 48 | 48 | 35 | 38 |
| tan δ (%) | 7.0 | 4.0 | 4.2 | 13.0 | 12.8 |

| Example | Exp. 5 | Exp. 6 | Exp. 7 |
|---|---|---|---|
| Electrolytically deposited paint (paint by wt.) | Mica powder (100) Epoxy ester type water-dispersion varnish (10) | Mica powder (100) Epoxy ester type water-dispersion varnish (15) | Mica powder (100) Epoxy ester type water-dispersion varnish (15) |
| Water-soluble resin & curing accelerator (%) | Acryl type water-soluble resin (2.0) 2E4MZ (3.0) | Acryl type water-soluble resin (2.0) Tris(dimethylaminomethyl) phenol (4.0) | Epoxy ester type water-soluble resin (2.0) Dimethylaminomethyl phenol (5.0) |
| Impregnating resin (part by wt.) | EPON 828 (100) HN 2200 (98) | EPON 828 (100) HN 2200 (98) | GP-5 (unsaturated polyester resin) |
| Heating-setting time (hr.) | 5 | 5 | 5 |
| Characteristics Initial | | | |
| BDV (kV) | over 50 | over 50 | over 50 |
| tan δ (%) | 0.2 | 0.2 | 0.2 |
| After deterioration | | | |
| BCF (kV) | 48 | 48 | 36 |
| tan δ (%) | 2.0 | 4.0 | 12.6 |

We claim:
1. A method for producing an electrically insulated conductive body which comprises the steps of:
    (a) immersing an electrically conductive body into an electrodeposition paint composition containing no chemical curing accelerator, said paint composition containing mica powder as an inorganic insulative substance and a water-dispersion varnish as an organic insulative substance, both substances being dispersed in water;
    (b) forming an electro-deposited layer on said electrically conductive body by electrophoresis, followed by heat-setting the resulting insulative coating layer;

(c) immersing the coated electrically conductive body into a water-soluble resin solution containing therein a water-soluble chemical curing accelerator, followed by heat-setting the same; and (d) impregnating the electro-deposited conductive body with an impregnating resin containing no chemical curing accelerator, followed by heat-setting the same.

2. The method for producing the electrically insulated conductive body as set forth in claim 1, wherein said electrodeposition paint is a mixture consisting of 100 parts by weight of mica powder and 5 to 30 parts by weight of a water-dispersion varnish.

3. The method for producing the electrically insulated conductive body as set forth in claim 1, wherein said water-soluble resin is an arcyl resin.

4. The method for producing the electrically insulated conductive body as set forth in claims 1 or 3, wherein concentration of said water-soluble resin ranges from 1 to 10% by weight.

5. The method for producing the electrically insulated conductive body as set forth in claim 1, wherein said water-soluble chemical curing accelerator is one selected from the group consisting of water-soluble organic amines and imidazoles.

6. The method for producing the electrically insulated conductive body as set forth in claims 1 or 5, wherein the concentration of the curing accelerator in said water-soluble resin is from 2 to 20% by weight.

* * * * *